(12) United States Patent  
Green

(10) Patent No.: US 6,291,949 B1  
(45) Date of Patent: Sep. 18, 2001

(54) CONTROL OF SWITCHED RELUCTANCE MACHINES

(75) Inventor: Charles Edward Brandon Green, Harrogate (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 09/467,600

(22) Filed: Dec. 20, 1999

(30) Foreign Application Priority Data

Dec. 21, 1998 (GB) .................................. 9828186

(51) Int. Cl.$^7$ ...................................................... H02P 7/06
(52) U.S. Cl. ............................................ 318/254; 318/701
(58) Field of Search .................................. 318/700, 701, 318/254, 714, 724

(56) References Cited

U.S. PATENT DOCUMENTS

| | | | |
|---|---|---|---|
| 4,772,839 | * 9/1988 | MacMinn et al. | 318/696 |
| 5,107,195 | * 4/1992 | Lyons et al. | 318/701 |
| 5,467,025 | * 11/1995 | Ray | 324/772 |
| 5,525,886 | * 6/1996 | Lyons et al. | 318/701 |
| 5,652,494 | * 7/1997 | Sugden | 318/701 |
| 5,811,954 | * 9/1998 | Randall | 318/701 |
| 5,859,518 | * 1/1999 | Vitunic | 318/701 |
| 5,867,004 | * 2/1999 | Drager et al. | 318/701 |
| 6,008,615 | * 12/1999 | Sugden | 318/701 |

FOREIGN PATENT DOCUMENTS 0 573 198 A1    12/1993   (EP) .

OTHER PUBLICATIONS

Mvungi, N.H., et al., "A New Sensorless Position Detector for SR Drives", 4$^{th}$ Int'l Conference, PDI of Electrical Engineers, Jul. 17–19, 1990, pp. 249–252.

Miller, T.J.E., et al., "Nonlinear theory of the switched reluctance motor for rapid computer–aided design", IEE Proceedings, Nov. 1990, V. 137, Pt. B. No. 6, pp. 337–347.

Ray, W.F., et al., "Sensorless Methods for Determining the Rotor Position of Switched Reluctance Motors", European Power Electronics Association, 1993, pp. 7–13.

Stephenson, J.M., et al., "The Characteristics, Design and Application of Switched Reluctance Motors and Drives", Seminar 5, PCIM Conference, Jun. 21–24, 1993, pp. 1–68.

Piron, M., "The Application of Magnetic Gauge Curves to Linear Motion Solenoid Actuators and Rotary Doubly Salient Reluctance Machines", International Conference on Electrical Machines, Sep. 2–4, 1998, Istanbul, Turkey, vol. 3, pp. 1674–1679.

Lyons, J.P. et al., "Flux/Current Methods for SRM Rotor Position Estimation" Proceedings of the Industry Applications Society Annual Meeting, U.S., New York, IEEE, 1991, pp. 482–487.

Green et al., "A Sensorless Switched Reluctance Drive", EMD97, Sep. 1–3 1997, pp. 64–68, Conference Publication No. 444, IEE 1997.

* cited by examiner

Primary Examiner—Robert E. Nappi
Assistant Examiner—Rina I. Duda
(74) Attorney, Agent, or Firm—Dicke, Billig & Czaja, P.A.

(57) ABSTRACT

A polyphase switched reluctance machine controlled by a control system using sensorless position detection. The controller is robust and reliable and operates over the entire speed range of the machine. In the chopping mode, diagnostic pulses of predetermined flux linkage are injected into an idle phase. In the single-pulse mode, position prediction is done using an active phase. A method of starting the machine uses diagnostic pulses in two phases to provide a unique value for position, allowing the drive to start or re-start under full torque.

37 Claims, 9 Drawing Sheets

CONTROL OF SWITCHED RELUCTANCE MACHINES

BACKGROUND OF THE INVENTION

1. Field of the Invention

The present invention relates to the control of switched reluctance machines, particularly those machines which are operated without a sensor to measure rotor position.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, circuitry is provided for detecting the angular position of the rotor and energizing the phase windings as a function of the rotor position. This is generally known as a switched reluctance machine and it may be operated as a motor or a generator. The characteristics of such switched reluctance machines are well known and are described in, for example, "The characteristics, design and application of switched reluctance motors and drives" by Stephenson and Blake, PCIM'93, Nürnberg, 21–24 June 1993, incorporated herein by reference. That paper describes in some detail the features of the switched reluctance machine which together produce the characteristic cyclically varying inductance of the phase windings.

FIG. 1 shows the principal components of a typical switched reluctance drive system. The input DC power supply 11 can be either a battery or a rectified and filtered AC supply and can be fixed or variable in magnitude. In some known drives, the power supply 11 includes a resonant circuit which produces a DC voltage which rapidly varies between zero and a predetermined value to allow zero voltage switching of power switches. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals indicating the angular position of the rotor. The output of the rotor position detector 15 may also be used to generate a speed feedback signal.

The rotor position detector 15 may take many forms, for example it may take the form of hardware, as shown schematically in FIG. 1. In some systems, the rotor position detector 15 can comprise a rotor position transducer that provides output signals that change state each time the rotor rotates to a position where a different switching arrangement of the devices in the power converter 13 is required. In other systems, the position detector can be a software algorithm which calculates or estimates the position from other monitored parameters of the drive system. These systems are often called "sensorless position detector systems" since they do not use a physical transducer associated with the rotor which measures the position. As is known in the art, many different approaches have been proposed in the quest for a reliable sensorless system. Some of these approaches are discussed below.

The energization of the phase windings in a switched reluctance machine depends on detection of the angular position of the rotor relative to the stator. This may be explained by reference to FIGS. 2 and 3, which illustrate the switching of a reluctance machine operating as a motor. FIG. 2 generally shows a rotor 24 with a rotor pole 20 approaching a stator pole 21 of a stator 25 according to arrow 22. As illustrated in FIGS. 2 and 3, a portion 23 of a complete phase winding 16 is wound around the stator pole 21. When the portion 23 of the phase winding 16 around stator pole 21 is energized, a force will be exerted on the rotor, tending to pull rotor pole 20 into alignment with stator pole 21. FIG. 3 generally shows typical switching circuitry in the power converter 13 that controls the energization of the phase winding 16, including the portion 23 around stator pole 21. When switches 31 and 32 are closed, the phase winding is coupled to the source of DC power and is energized. Many other configurations of lamination geometry, winding topology and switching circuitry are known in the art: some of these are discussed in the Stephenson & Blake paper cited above. When the phase winding of a switched reluctance machine is energized in the manner described above, the magnetic field set up by the flux in the magnetic circuit gives rise to the circumferential forces which, as described, act to pull the rotor poles into line with the stator poles.

In general, the phase winding is energized to effect the rotation of the rotor as follows. At a first angular position of the rotor (called the "turn-on angle", $\theta_{ON}$), the controller 14 provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air gap which acts on the rotor poles to produce the motoring torque. The magnetic flux in the machine is supported by the magnetomotive force (mmf) which is provided by a current flowing from the DC supply through the switches 31 and 32 and the phase winding 16. Current feedback is typically employed and the magnitude of the phase current is controlled by chopping the current by rapidly switching one or both of switching devices 31 and/or 32 on and off. FIG. 4(a) shows a typical current waveform in the chopping mode of operation, where the current is chopped between two fixed levels. In motoring operation, the turn-on angle $\theta_{ON}$ is often chosen to be the rotor position where the center-line of an inter-polar space on the rotor is aligned with the center-line of a stator pole, but may be some other angle.

In many systems, the phase winding remains connected to the DC bus (or connected intermittently if chopping is employed) until the rotor rotates such that it reaches what is referred to as the "freewheeling angle", $\theta_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle", $\theta_{OFF}$, (e.g. when the center-line of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease. It is known in the art to use other switching angles and other current control regimes.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero. It is well known that the values of turn-on, freewheel and turn-off angles can be predetermined and stored in some suitable format for retrieval by the control system as required, or can be calculated or deduced in real time.

It will be realized that sensorless position detection systems have to be capable of providing rotor position signals in both chopping and single-pulse operating modes if the full capabilities of the switched reluctance machine are to be realized. Though many sensorless systems have been proposed, they tend to be limited to either one mode of operation or to impose severe restrictions on the operation of the System. One proposed method using diagnostic pulses in idle phases is described in "A new sensorless position detector for SR drives" by Mvungi et al., Proc. PEVD Conf., IEE Pub'n No. 324, London, Jul. 17–19, 1990, pp. 249–252, which is incorporated herein by reference. Typically this approach is successful in the chopping mode, where the rise and fall times of the current are relatively short compared with the overall excitation cycle. The paper concedes that a different approach is required for high-speed (i.e. single-pulse) operation.

An approach for high speed operation is exemplified by EP-A-0573198 (Ray), incorporated herein by reference, which discloses a method of flux and current measurement leading to predictions of rotor position. Many other sensorless position detection systems are reviewed and categorized in "Sensorless methods for determining the rotor position of switched reluctance motors", Ray et al., Proc. EPE '93 Conference, Brighton, UK, Sep., 13–16 1993, Vol. 6, pp. 7–13, incorporated herein by reference, and it was concluded in that article that none of these methods was entirely satisfactory for operation over both operating ranges.

SUMMARY OF THE INVENTION

According to embodiments of the invention there is provided a method of determining rotor position in a polyphase switched reluctance machine comprising a rotor, a stator and two or more phases of energizable windings, the method comprising: injecting a, first diagnostic pulse of predetermined flux linkage into one of the phase windings; injecting a second diagnostic pulse of predetermined flux linkage into another of the phase windings substantially simultaneously with injection of the first diagnostic pulse; determining first possible rotor positions from a detected characteristic of the first pulse; determining second possible rotor positions from a detected characteristic of the second pulse; and resolving rotor position ambiguity by a comparison of the first and second possible rotor positions.

Embodiments of the invention usefully exploit the realization that the ambiguity of a point on a phase inductance cycle being either nearer to one end of the cycle than the other can be resolved by comparing a pair of such pulses in separate phases. There will be only one point in the cycle where the detected characteristic from both pulses coincide.

Preferably, the detected characteristic is the current in the winding.

The possible values of rotor position may be stored in a look-up table. Because of the symmetrical relationship that exists between motoring and generating modes of operation in a machine with symmetry in its magnetic characteristics, only one set of values need be stored to cover both modes of operation. The resolution of the ambiguity is conveniently effected by comparing the rotor positions indicated and choosing the one commonly indicated by the detected characteristics.

Embodiments of the invention can be used on start-up of a machine or when rotor position is lost during running. In the latter case it is preferable to allow for the decay of currents or fluxes to substantially zero to avoid erroneous calculations of position.

Embodiments of the invention also extend to a switched reluctance machine comprising a rotor, a stator and a plurality of phases of energizable windings, switch means actuatable for energizing the phases, position detector means for deriving a position of the rotor relative to the stator, the position detector means comprising: means for injecting a first diagnostic pulse of predetermined flux linkage into one of the phases; means for injecting a second diagnostic pulse of predetermined flux linkage into another phase substantially simultaneously with injection of the first diagnostic pulse; and means for determining first possible rotor positions from a characteristic of the first pulse and second possible rotor positions from a characteristic of the second pulse; and means for resolving rotor position ambiguity by an analysis of the first and second possible rotor positions.

Preferably, the machine comprises means for actuating the switch means in accordance with the resolved rotor position.

BRIEF DESCRIPTION OF THE DRAWINGS

The invention can be put into practice in a number of ways, some of which will now be described by way of example with reference to the accompanying drawings in which.

DETAILED DESCRIPTION OF PREFERRED EMBODIMENTS

Figure 1:
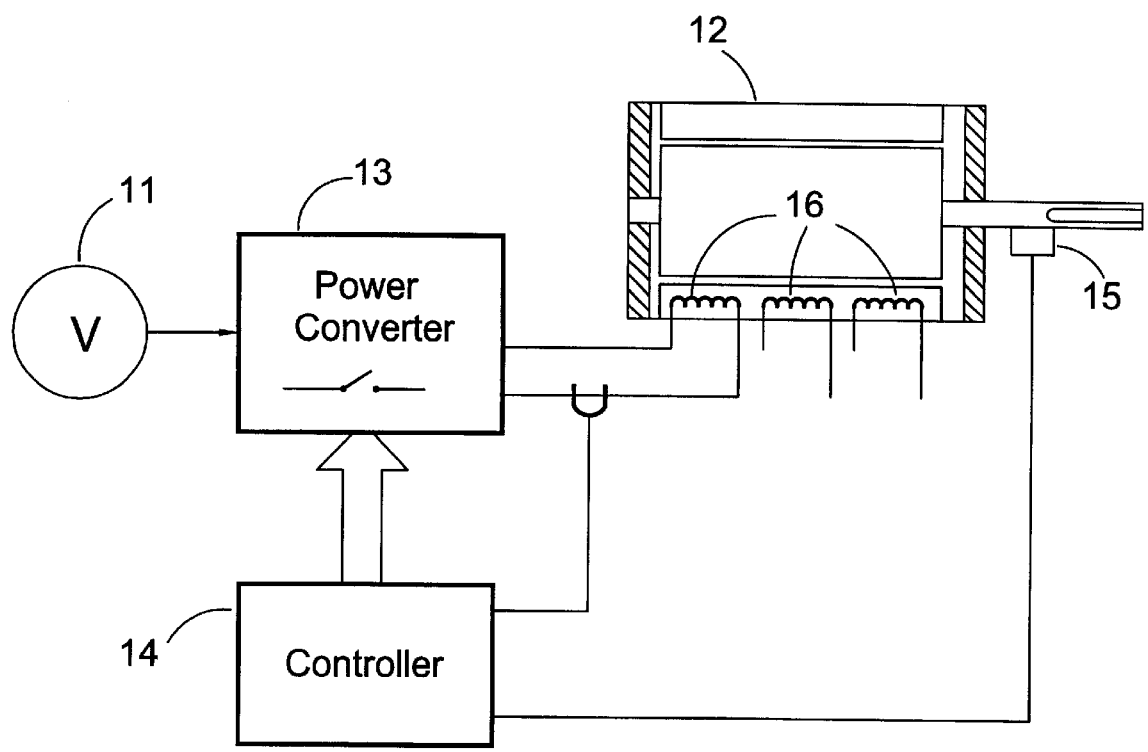
FIG. 1 shows the principal components of a typical switched reluctance drive system.
Figure 2:
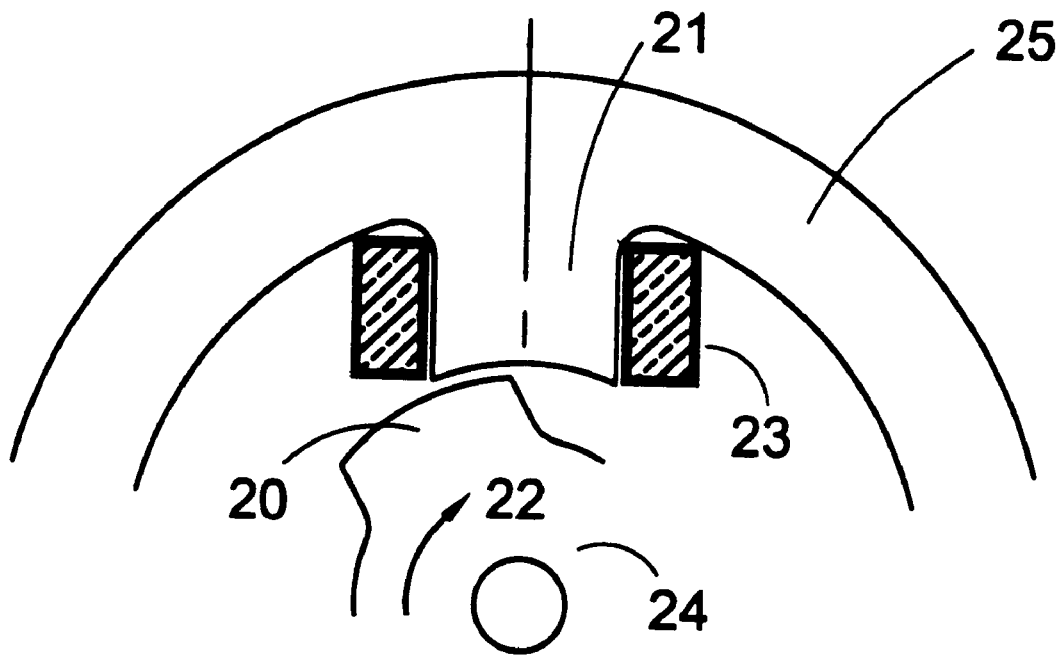
FIG. 2 shows a typical schematic diagram of a rotor pole approaching a stator pole.
Figure 3:
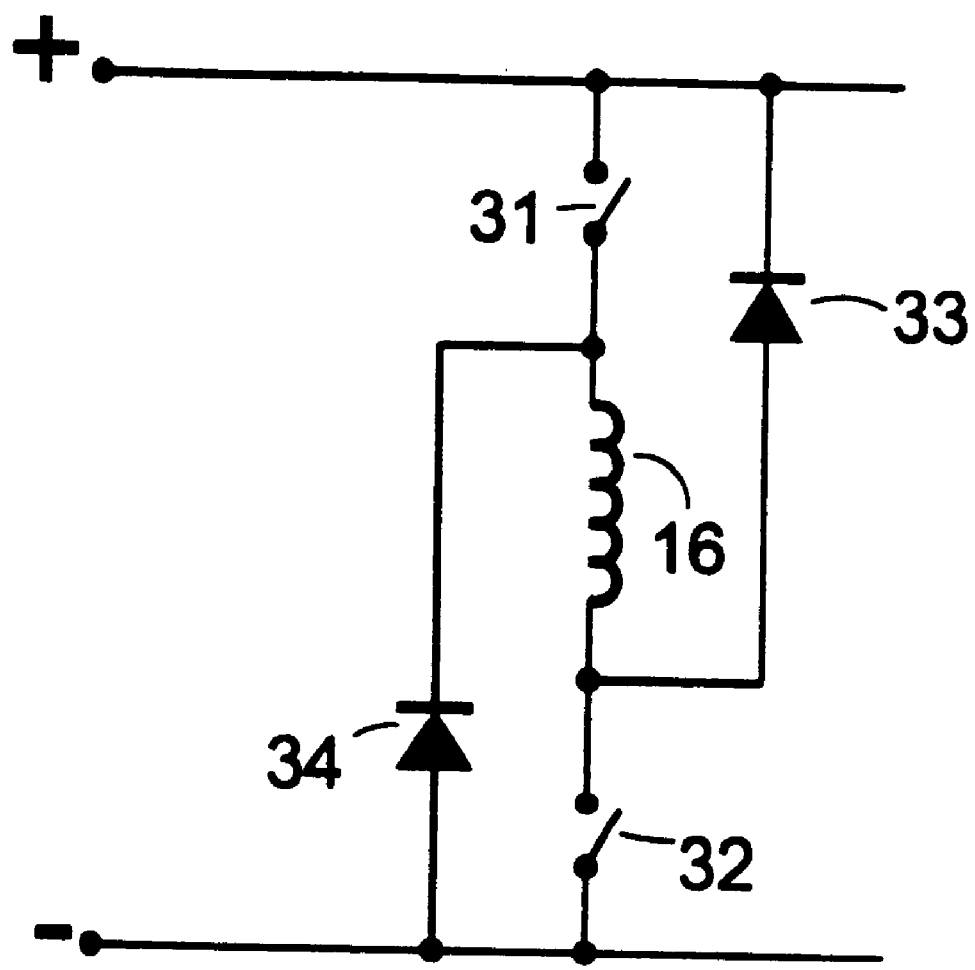
FIG. 3 shows typical switching circuitry in a power converter that controls the energization of the phase windings of the machine of FIG. 1.
Figure 4A:
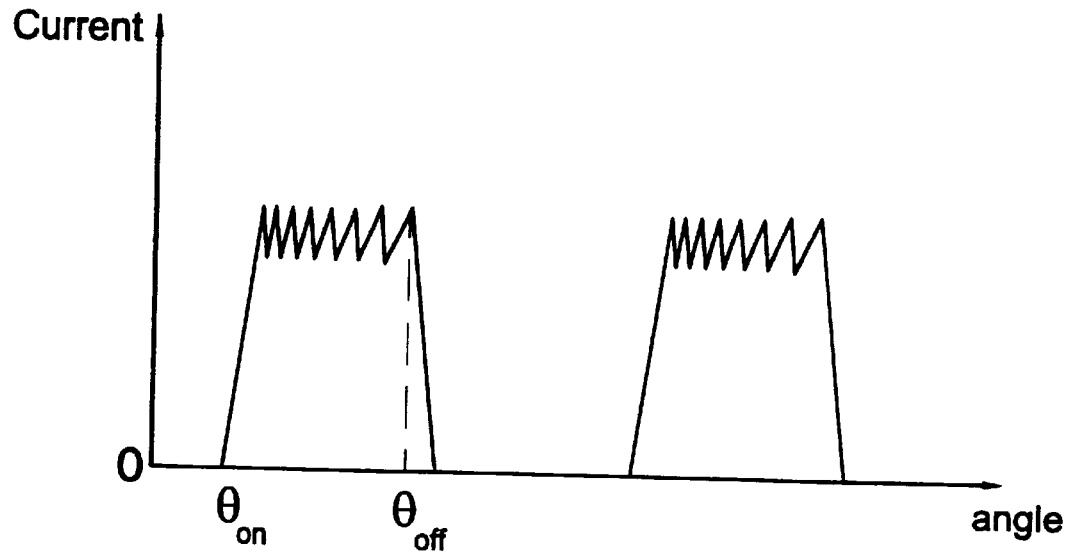
FIGS. 4(a) and 4(b) illustrate typical current waveforms of a switched reluctance drive operating in chopping and single-pulse modes, respectively.
Figure 4B:
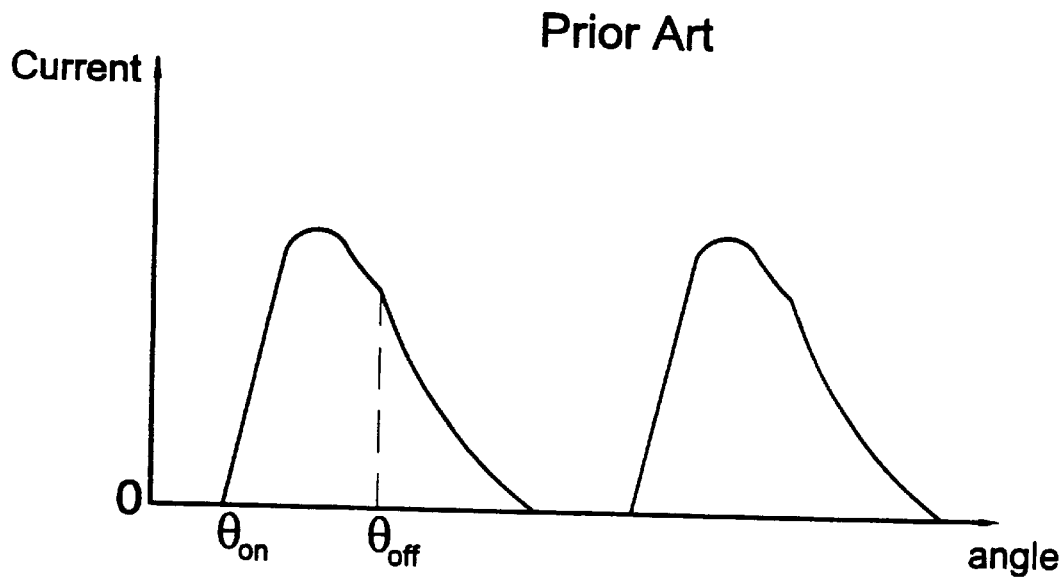
Figure 5:
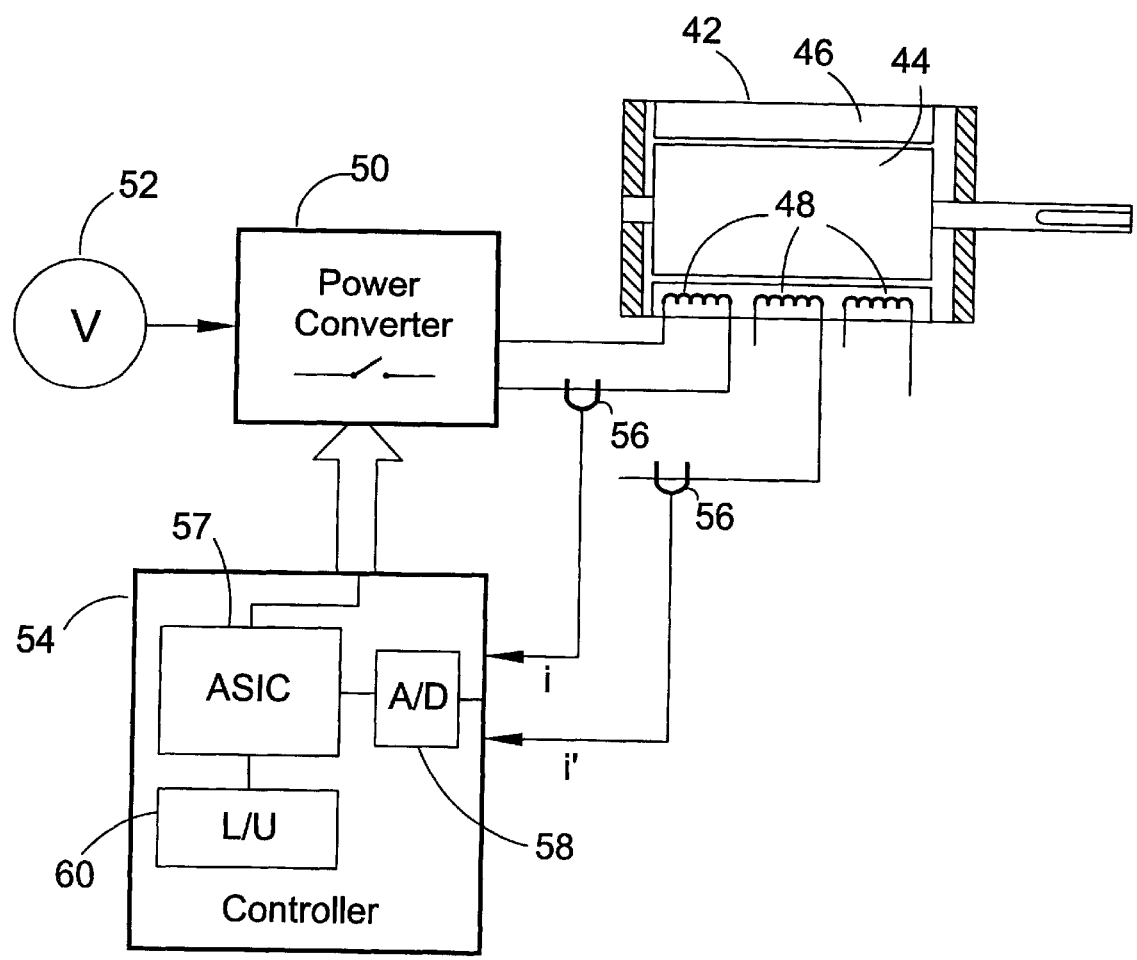
FIG. 5 is a schematic diagram of a switched reluctance drive system according to an embodiment of the invention.

Referring to FIG. 5, a switched reluctance machine system comprises a reluctance machine 42 having a rotor 44 mounted to rotate in a stator 46. The stator has two or more (in this case three) phase windings 48 which are separately energizable as referred to above.

A conventional switch arrangement 50 is connected to each phase winding. The connection of only one of the windings to the schematically represented switch arrangement is shown in FIG. 5 for the sake of clarity. The switch arrangement controls the application of a DC supply voltage V from a supply 52.

The switch arrangement is controlled by a controller 54 that comprises an application specific integrated circuit (ASIC) that is programmed to receive current information (i, i') from each of a pair of the windings 48 each by means of a current sensing device 56, such as a Hall-effect device. The ASIC is notionally illustrated as being connected with an analog-to-digital converter 58 and a look-up table memory 60. In practice, systems may use one A/D channel multiplexed between the two current signals or may use two dedicated channels, one for each current transducer. Such systems per se are known in the art. The current transducers may conveniently also supply signals useful for other current monitoring functions in the system.

The A/D converter 58 is arranged to digitize the signals representative of the current values sensed by the devices 56. The look-up table is accessed by the ASIC to convert values of detected current into rotor angles. The values of rotor angle for a given current are machine-specific, but should be common to the currents detected on both phases on the assumption that the phase arrangements are substantially similar. However, separate look-up tables for each phase may be used where the phase characteristics differ to any great extent.

The ASIC is programmed to run a slow-speed (chop) control regime and a high-speed (single-pulse) control regime as discussed above and a starting method as will be described below. It will be appreciated that the control function of the ASIC is based in software programmed into it. Thus, its operation will be described partly by means of the flow chart of FIG. 9 (discussed below).

When the machine is operating at a slow speed, rotor position may be determined by injecting a diagnostic pulse of flux linkage of a predetermined magnitude into an inactive (idle) phase winding. The flux linkage is the time integral of the electromotive force (emf applied to the winding, i.e. it is given by:

$$\psi = \int (V - iR) dt \quad (1)$$

in which $\psi$ is the flux linkage of the coil, V is the effective supply voltage (less any voltage drops in the power converter 50), i is the coil current and R is the coil resistance. The current is detected by the current sensing device 56 in each phase winding according to the flux linkage pulses injected. The integration of (V–iR) can be performed in the ASIC according to known methods. Hence, a diagnostic pulse is produced by: applying the voltage from the supply 52; monitoring the increasing value of the integral; and removing the voltage when the desired value of flux linkage is reached. Knowing the values of flux linkage and current, the rotor position can be looked up in a table 60 to give the value of rotor angle corresponding to these values. It will be appreciated that, if the winding resistance R is small, the iR term in the equation can be ignored for practical purposes.

The low-speed mode uses a method of injecting diagnostic pulses into an inactive phase. When a pulse of flux-linkage reaches the predetermined value, the current is recorded and the phase is turned off. From a table of current against rotor angle for this fixed flux, the position can be read off. When the flux-linkage has decayed to zero, a subsequent pulse can be initiated and the process repeated.

The repetition rate of the pulses is a matter of choice for the designer of the system: the pulses can be injected at a fixed frequency or a new pulse can be initiated as soon as the measurement of the previous one is complete and the circuit is ready to begin a new measurement. In general terms, the flux linkage pulse has a peak value of the order of 5% to 10% of the peak flux linkage of the machine. Particularly low values will generally give rise to inaccuracy due to measurement noise. Particularly high values will generally give rise to acoustic noise and/or reduced output due to negative torque being generated. In addition, the larger the pulse, the longer it takes to reach its peak value and the less certainty there is in the calculated position. The peak flux linkage value has to be chosen to suit the circumstances. Note that it is also possible to use a pulse of fixed current height and to read the flux-linkage associated with it to read off position from a position/flux-linkage table.

For motoring operation, the pulses are positioned in the falling inductance region. For generating operation, the pulses are positioned in the rising inductance region. Provided the inductance profile of the machine is symmetrical, only one set of position vs. current data need be stored since a simple reflection about the maximum or minimum inductance angle will give the correct position for either mode. The system is shown schematically in FIG. 6, where LA, LB and LC denote the idealized inductance profiles of a 3-phase machine, Exc A, Exc B and Exc C denote the excitation angles for motoring operation, and the regions D denote the rotor angles over which the phases may be diagnosed.

There are alternative methods of calculating flux-linkage. The integral given in equation (1) correctly allows for the voltage drops across the switches and for the voltage drop across the resistance of the winding. However, this entails sensing the voltage across each phase winding. In many applications, it is possible simply to integrate the DC link voltage, controlling the integrator by a knowledge of whether the switches are on, freewheeling or off. Although less accurate than the method of equation (1), it reduces the amount of hardware required, since ory one voltage sensor is necessary.

Figure 6:
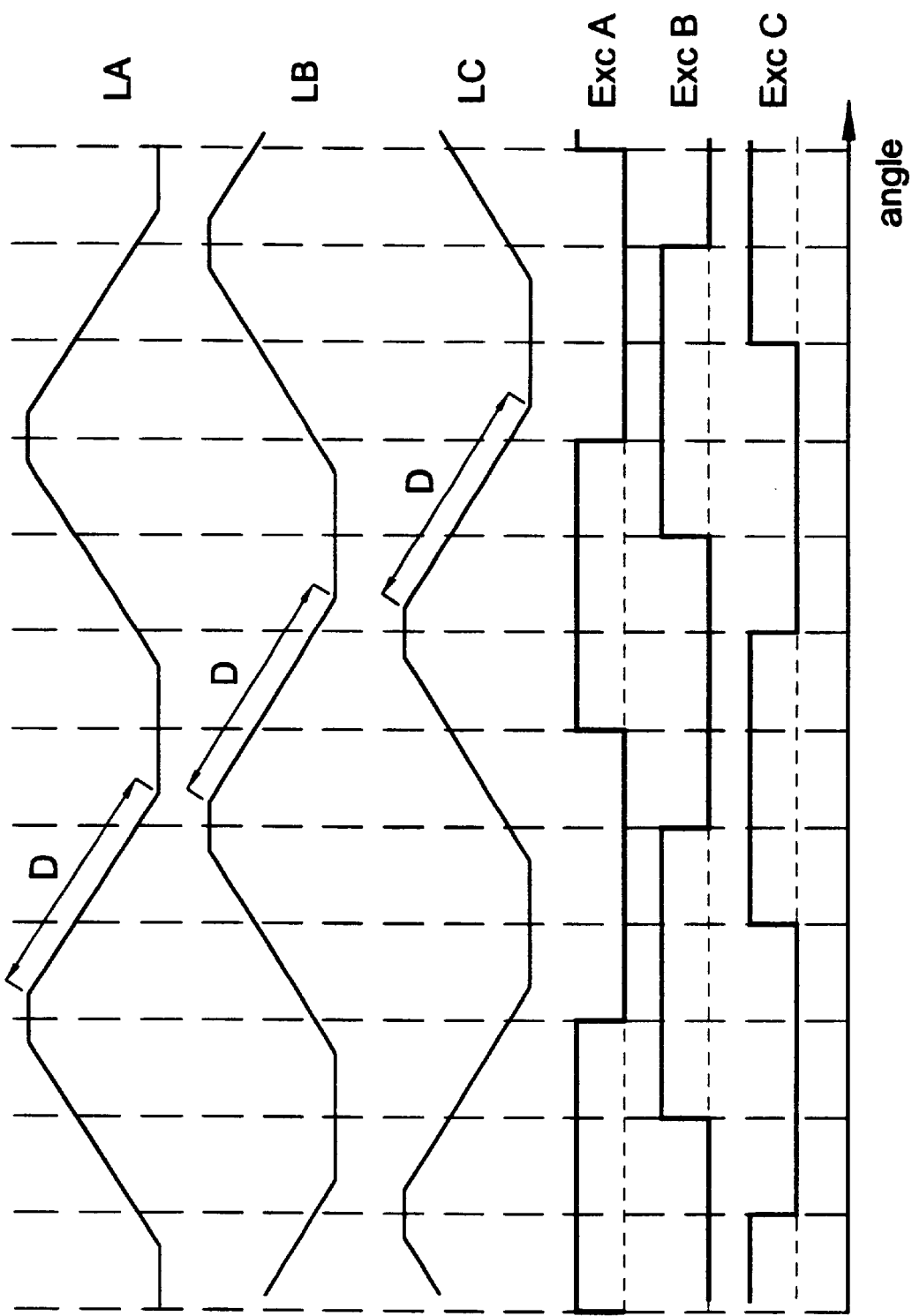
FIG. 6 shows the idealized inductance profiles, excitation regions and diagnostic regions of a machine operated in low-speed mode according to the invention.

Preferably, the peak of the flux linkage pulse should occur in the region D indicated in FIG. 6 for any machine speed. Of course, at standstill the duration of the pulse is not an issue. However, account has to be taken of the fact that, as the speed rises, the same angle indicated by the region D will be covered in a shorter time. Thus, if the peak value of the diagnostic pulse is not to vary with machine speed, it must be long enough to establish the desired level of flux linkage, but short enough to be usable at the highest machine speeds. Preferably, there is sufficient time to inject two or three pulses into region D, so that several measurements of position are possible in each diagnostic period. Polling of a set of measurements may be used to lessen the effect of any significantly inaccurate ones as described below. Multiple measurements in the same diagnostic period also provide updated position information which can be used to beneficial effect when, for example, the machine speed is changing.

Figure 7:
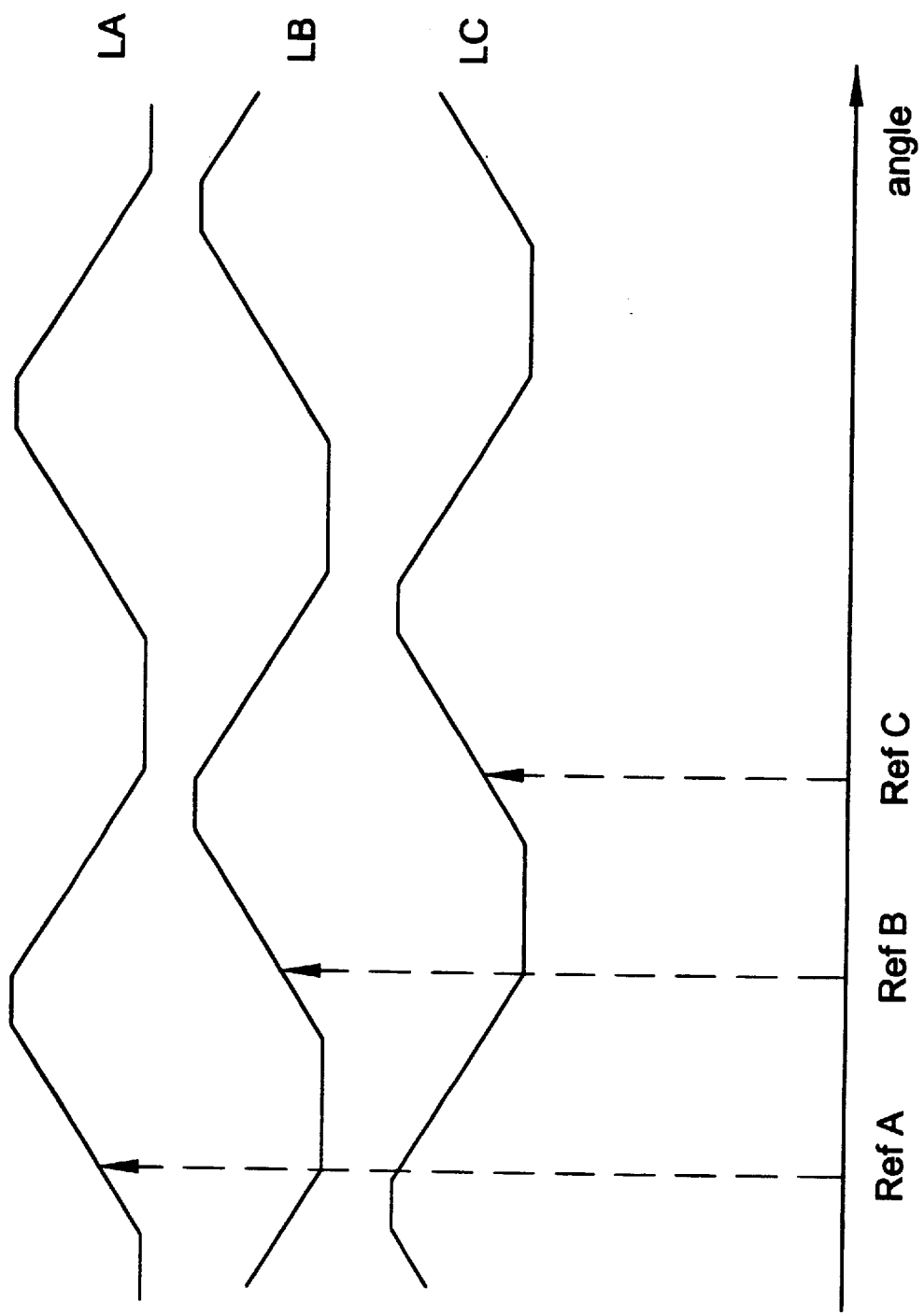
FIG. 7 shows idealized inductance profiles and possible reference angle positions for a machine operated in high-speed mode, according to an embodiment of the invention.

The high-speed mode, by contrast, interrogates an active phase and takes data from the phase only once per inductance cycle. An angular reference point is predetermined and current and flux-linkage are measured at this point. Any error between the measured and expected flux-linkage is used to derive a positional error and hence a revised estimate of position. The arrangement is shown schematically in FIG. 7, where LA, LB and LC denote the idealized inductance profiles of a 3-phase machine and Ref A, Ref B and Ref C denote the reference angles for the three phases for motoring operation. As for the low-speed mode, motoring and generating operation can be catered for by exploiting the symmetry of the inductance profile.

In either the low-speed or high-speed mode, the estimate of position can be used as the basis of a calculation of speed and/or acceleration.

Both low-speed and high-speed modes require at least an approximate initial knowledge of rotor position to operate successfully. In the low-speed mode, the appropriate region for injection of the diagnostic pulses must be found. In the high-speed mode, the flux-linkage and current measurements must be taken sufficiently close to the reference angle that the position error is small. However, when the machine is at standstill, or has been coasting from speed, or if a transient disturbance in the load or the control system causes loss of positional data, no approximate knowledge of position exists and the system is extremely unlikely to re-synchronize of its own accord. The prior art methods of control at low and high speeds have several shortcomings in that they do not provide a reliable method of starting the machine nor of recovering operation if a transient occurs to cause loss of position detection. Embodiments of the invention provide techniques to overcome these deficiencies.

Figure 8:
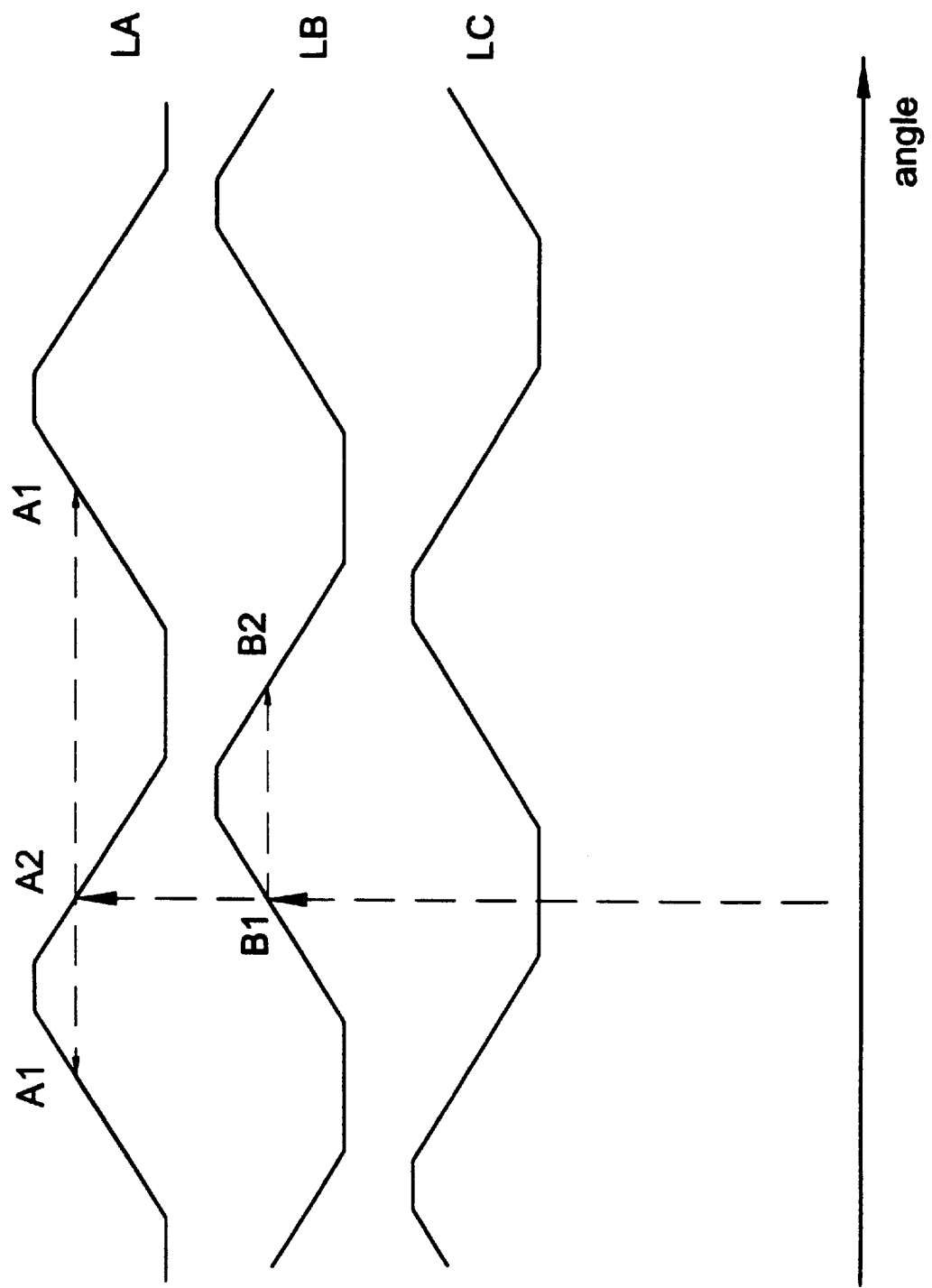
FIG. 8 shows positions determined during start-up, according to an embodiment of the invention.

If no knowledge of rotor position exists and it is required to start (or re-start) excitation of the winding, diagnostic pulses can be injected into a phase, e.g. Phase A as shown in FIG. 8. However, ambiguity exists because the measurement of current and the subsequent calculation of, say, A2 would also correspond to the position of A1. If, however, a simultaneous measurement of phase B is made, positions B1 and B2 are found. Since a unique position must exist at any one angle, only the two points which match (A2 and B1) can be correct and the rotor position is thereby determined. This is based on the measurements being taken practically simultaneously, so it is important that any diagnostic pulses which are used reach their predetermined value at substantially the same time. This condition is fulfilled when pulses of flux-linkage are used since, when the drive is operated from a substantially constant DC bus, the time taken for the winding to reach a given flux-linkage is effectively determined by the bus voltage, provided that the phases are identical in number of turns and resistance. For this reason, prior art systems using pulses of fixed value of current are not suitable as, even if they were started simultaneously, they would reach their predetermined value at different times and hence introduce errors into the calculation of position.

Figure 9:
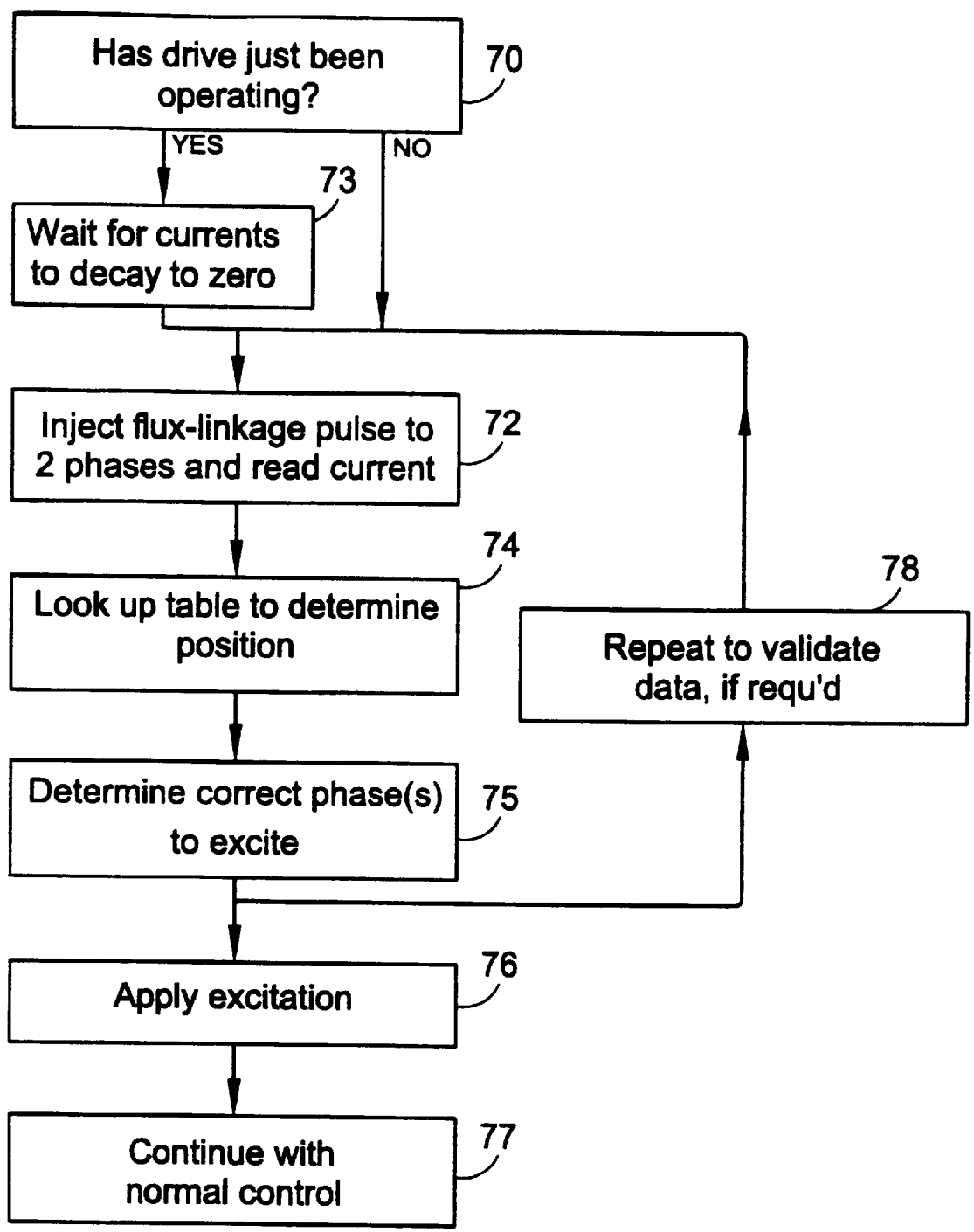
FIG. 9 is a flow chart according to an embodiment of the invention.

A method of determining rotor position is illustrated in the flow chart of FIG. 9, which illustrates part of the software in the ASIC.

In order for the method to work satisfactorily, the flux linkage in the phases must initially be zero any residual flux linkage will cause the integration process to begin from the wrong starting point. The program ascertains at block 70 whether the machine has just been operating by accessing the time since the most recent switch actuation. If it is determined that a sufficiently long period has elapsed since the last switching activity for the winding currents (and flux linkage) to be zero, the program proceeds to block 72. If the elapsed time is insufficient, a delay is implemented at block 73 before block 72 in order to allow time for the currents and the flux in the windings to have decayed.

At block 72 the diagnostic flux linkage pulses are injected into two of the machine phases by actuating the switch arrangement appropriately. The pulses of predetermined flux-linkage are produced by an actuation of the switch arrangement so that the DC supply is applied to the two windings simultaneously and for the same duration. According to the same block 72, the currents in the two phase windings are detected by the current sensing devices and, at the end of the diagnostic pulse, converted by the A/D converter 58 in the controller 54 into a pair of digital values. The look-up table 60 of the controller 54 is accessed by the ASIC at block 74 with the detected current value to provide the two angular positions on each of the phase inductance cycles for the monitored phases at which the detected value of current will occur for the given flux linkage value of the pulse. In order to save on storage space, it is possible to store only one value of angle for each value of current and to use the symmetry of the magnetic characteristics to deduce the other angles.

As mentioned above, there is a unique position corresponding to the combination of the pair of current values for each of the phases. Thus, while an ambiguity as to which of a pair of angular positions is denoted by a current value from a single phase, the combination of current values for a pair of phases will have only one rotor angle at which there is substantial coincidence, as the other current values will denote disparate positions on the respective rotor position cycles. Thus, the ASIC is programmed to make a comparison of the possible rotor angles and to elect the angle which is common to both current readings. Some error may be present in the readings. Thus, the ASIC can be programmed in any one of a number of ways to accept angles which are close to one another within a level of tolerance.

At block 75 the ASIC is programmed to determine the appropriate phase to energize on the basis of the calculated rotor angle. The determination as to which phase to energize is based on the position of the rotor pole(s) that is/are in the best torque-producing position (for the desired direction of travel) for one phase in preference to the others. Based on the decision, the appropriate switches are actuated to apply the supply voltage V to that phase winding for excitation at block 76. The ASIC then cedes normal control of the motor over to another software routine in the ASIC at block 77. By means of the invention, the rotor position is now established. The rotor position can be established either when the rotor is stationary or coasting, as long as sufficient time has elapsed for current and flux in the windings to have decayed in order for appropriately accurate readings to be taken of the monitored phases.

Sensorless position detection systems generally have to operate in electrically noisy environments close to power switching devices, and this often leads to corruption of the measurements of flux-linkage and current, leading to the calculation of spurious positional data. In order to improve the robustness of the system, a method of checking the validity of the calculated positional data has been developed. Each time a new position is calculated, the values of position, time and speed can be stored. Using the last n stored values, a predicted position can be extrapolated for comparison with the newly calculated one. If the newly calculated and predicted values do not agree within a predetermined amount, an error count is incremented and the predicted value used in place of the calculated one. If they do agree, any existing error count is decremented and the calculated value is used. At standstill the number of iterations may be limited, but can still be used to check the rotor position. Particularly under normal running over successive cycles of measurement, a picture is built up of the reliability of the positional data. If the error count exceeds a certain value representative of, say, 5 consecutive calculations not agreeing, the control system can decide that it has lost synchronism with the real position of the rotor and prevent (or shut down) excitation of the machine before any more serious event occurs. The storage and extrapolation of the values can be done by any convenient means but typically by digital storage in memory locations. It has been found that using n=8 gives a good compromise between system stability and storage space.

It will be seen that this option in the method of the invention is carried out by a repeat of blocks 72 and 74 by looping back according to block 78. As indicated above, this iterative process can be implemented in rotor position diagnosis on the running machine as well as when establishing or re-establishing rotor position.

Thus, the series of n measurements can be used to build up a basis for checking the reliability of the (n+1)th measurement before applying excitation to the phases. These measurements can be taken from successive pulses.

It will be realized that this method of the invention can be used whenever a situation of loss of position data occurs and 2 phases are available for diagnosis. When starting from zero speed or while coasting, these conditions are immediately fulfilled. If a transient disturbance occurs in the load or the control system which causes sudden loss of positional data, the conditions can be fulfilled by removing excitation from all (or at least two of) the phases and allowing sufficient time for the phase currents to decay to zero. For example, the peak flux linkage can be estimated and a time for it to decay to zero estimated or the current can be monitored by means of the current transducers. Two phases can then be diagnosed as described to produce the required positional data and the appropriate excitation applied to the phases to produce the required torque in the required direction.

Alternatively, if a system of checking the reliability of the data is being used while the machine is running, as described above, then at start-up it can be over-ridden and a single pair of measurements on the two phases performed as described. Alternatively, if the winding is put into the freewheeling condition after the required flux-linkage is reached, successive measurements may be taken from the one extended pulse.

The above description has been based on a system which uses a look-up table of rotor angles for current values. This is convenient in a digital implementation of the control system. However, it is equally possible to use analytical methods of determining the position by inserting the measured value of current in a formula which describes the relationship between current and rotor angle at the flux-linkage being used for the diagnosis. Such a method may be preferable to the look-up table if digital storage space is limited and the use of a small table gives rise to unacceptably high quantization errors. Any one of several analytical expressions could be used, e.g. the Frohlich relationship described by Miller et al. in "Nonlinear theory of the switched reluctance motor far rapid computer-aided design" in Proc. IEE Pt B, Vol. 137, No. 6, November 1990, pp. 337–347, incorporated herein by reference, or the use of gauge curves as described by Piron in "The application of magnetic gauge curves to linear motion solenoid actuators and rotary doubly salient reluctance machines" in ICEM'98, International Conference on Electrical Machines, Sep. 2–4, 1998, Istanbul, Turkey, Vol. 3, pp. 1674–1679, incorporated herein by reference.

It will be realized that, while the above examples have been described in relation to a three-phase machine, the invention can be applied to any polyphase switched reluctance machine with any number of poles. Similarly, the invention could be applied to a linear machine where the moving part (often referred to as a "rotor") travels linearly. Thus, the skilled person will appreciate that variation of the disclosed arrangements are possible without departing from the invention. Accordingly, the above description of several embodiments is made by way of example and not for the purposes of limitation. The present invention is intended to be limited only by the spirit and scope of the following claims.

What is claimed is:

1. A method of determining rotor position in a polyphase switched reluctance machine comprising a rotor, a stator and two or more phases of energizable windings, the method comprising:

injecting a first diagnostic pulse of predetermined flux linkage into one of the phase windings;

injecting a second diagnostic pulse of predetermined flux linkage into another of the phase windings substantially simultaneously with injection of the first diagnostic pulse;

determining first possible rotor positions from a detected characteristic of the first pulse;

determining second possible rotor positions from a detected characteristic of the second pulse; and resolving rotor position ambiguity by a comparison of the first and second possible rotor positions;

wherein at least one determination is made while the rotor is moving.

2. A method as claimed in claim 1 in which the detected characteristic of the first and second pulses is the current in the winding.

3. A method as claimed in claim 1 including storing in a look-up table pairs of possible values of rotor position for each of a range of values of the characteristic of the first and second pulses.

4. A method as claimed in claim 3 in which the look-up table stores a single set of values of rotor positions for values of the detected characteristic for both motoring and generating.

5. A method as claimed in claim 3 in which the look-up table stores a single value of rotor position for each of a range of values of the characteristics of the first and second pulses, the method including deriving the other of the possible values by calculation from symmetry of the magnetic characteristics of the machine.

6. A method as claimed in claim 5 in which the look-up table stores a single set of values of rotor positions for values of the detected characteristic for both motoring and generating.

7. A method as claimed in claim 1 in which resolving the ambiguity includes comparing the possible rotor positions indicated by the characteristics of the first and second pulses and selecting the rotor position commonly indicated by the detected characteristics.

8. A method as claimed in claim 1 in which the first and second diagnostic pulses are injected by actuation of means for switching.

9. A method as claimed in claim 1 in which successive pairs of diagnostic pulses are injected at fixed frequency.

10. A method as claimed in claim 1 in which successive pairs of diagnostic pulses are injected at variable frequency.

11. A method as claimed in claim 1 in which the first and second diagnostic pulses are injected only when flux in the respective windings is substantially zero.

12. A method as claimed in claim 11 including delaying injection of the pulses to allow for decay of fluxes to substantially zero.

13. A method as claimed in claim 1, including checking the rotor position by comparing a first determination with at least a second determination of rotor position.

14. A method as claimed in claim 13 in which the machine is energized or de-energized depending on the check of the rotor position.

15. A method as claimed in claim 1 including de-energizing the windings and, thereafter, delaying injection of the first and second pulses to allow winding currents to decay to zero.

16. A method of determining rotor position in a polyphase switched reluctance machine comprising a rotor, a stator and two or more phases of energizable windings, the method comprising:
- injecting a first diagnostic pulse of predetermined flux linkage into one of the phase windings;
- injecting a second diagnostic pulse of predetermined flux linkage into another of the phase windings substantially simultaneously with injection of the first diagnostic pulse;
- determining first possible rotor positions from a detected characteristic of the first pulse;
- determining second possible rotor positions from a detected characteristic of the second pulse; and
- resolving rotor position ambiguity by a comparison of the first and second possible rotor positions;
- wherein at least one determination is made while the rotor is stationary.

17. A method as claimed in claim 16 in which the detected characteristic of the first and second pulses is the current in the winding.

18. A method as claimed in claim 16 including storing in a look-up table pairs of possible values of rotor position for each of a range of values of the characteristic of the first and second pulses.

19. A method as claimed in claim 18 in which the look-up table stores a single set of values of rotor positions for values of the detected characteristic for both motoring and generating.

20. A method as claimed in claim 18 in which the look-up table stores a single value of rotor position for each of a range of values of the characteristics of the first and second pulses, the method including deriving the other of the possible values by calculation from symmetry of the magnetic characteristics of the machine.

21. A method as claimed in claim 20 in which the look-up table stores a single set of values of rotor positions for values of the detected characteristic for both motoring and generating.

22. A method as claimed in claim 16 in which resolving the ambiguity includes comparing the possible rotor positions indicated by the characteristics of the first and second pulses and selecting the rotor position commonly indicated by the detected characteristics.

23. A method as claimed in claim 16 in which the first and second diagnostic pulses are injected by actuation of means for switching.

24. A method as claimed in claim 16 in which successive pairs of diagnostic pulses are injected at fixed frequency.

25. A method as claimed in claim 16 in which successive pairs of diagnostic pulses are injected at variable frequency.

26. A method as claimed in claim 16 in which the first and second diagnostic pulses are injected only when flux in the respective windings is substantially zero.

27. A method as claimed in claim 26 including delaying injection of the pulses to allow for decay of fluxes to substantially zero.

28. A method as claimed in claim 16, including checking the rotor position by comparing a first determination with at least a second determination of rotor position.

29. A method as claimed in claim 28 in which the machine is energized or de-energized depending on the check of the rotor position.

30. A method as claimed in claim 16 in which at least one determination is made while the rotor is moving.

31. A method as claimed in claim 30 including de-energizing the windings and, thereafter, delaying injection of the first and second pulses to allow winding currents to decay to zero.

32. A switched reluctance drive comprising a machine having a rotor, a stator and a plurality of phases of energizable windings, means actuatable for energizing the phases, means for deriving a position of the rotor relative to the stator and means for actuating the means for energizing in accordance with rotor position, the means for determining a position of the rotor comprising:
- means for injecting a first diagnostic pulse of predetermined flux linkage into one of the phases;
- means for injecting a second diagnostic pulse of predetermined flux linkage into another phase substantially simultaneously with injection of the first diagnostic pulse;
- means for determining first possible rotor positions from a characteristic of the first pulse and second possible rotor positions from a characteristic of the second pulse, wherein at least one determination is made while the rotor is moving; and
- means for resolving rotor position ambiguity by an analysis of the first and second possible rotor positions.

33. A switched reluctance drive as claimed in claim 18, including at least one current monitor arranged to detect the current in a corresponding phase winding and in which the characteristic of the first and second pulses is current.

34. A switched reluctance drive comprising a machine having a rotor, a stator and a plurality of energizable windings, a switch arrangement actuatable for energizing the phases, at least one position detector deriving a position of the rotor relative to the stator, and a controller for actuating the switch arrangement in accordance with rotor position, the at least one position detector comprising:
- an injection allurement for injecting a first diagnostic pulse of predetermined flux linkage into one of the phases and for injecting a second diagnostic pulse of predetermined flux linkage into another phase substantially simultaneously with injection of the first diagnostic pulse;
- a determiner for determining first possible rotor positions from a characteristic of the first pulse and second possible rotor positions from a characteristic of the second pulse, wherein at least one determination is made while the rotor is moving; and
- an analyzer for resolving rotor position ambiguity by an analysis of the first and second possible rotor positions.

35. A method of determining rotor position in a polyphase switched reluctance machine comprising a rotor, a stator and two or more phases of energizable windings, the method comprising:
- injecting a first diagnostic pulse of predetermined flux linkage into one of the phase windings;
- injecting a second diagnostic pulse of predetermined flux linkage into another of the phase windings substantially simultaneously with injection of the first diagnostic pulse;

determining first possible rotor positions from a detected characteristic of the first pulse;

determining second possible rotor positions from a detected characteristic of the second pulse;

resolving rotor position ambiguity by a comparison of the first and second possible rotor positions; and storing in a look-up table pairs of possible values of rotor position for each of a range of values of the characteristic of the first and second pulses, wherein the look-up table stores a single set of values of rotor positions for values of the detected characteristic for both motoring and generating.

36. A method of determining rotor position in a polyphase switched reluctance machine comprising a rotor, a stator and two or more phases of energizable windings, the method comprising:

injecting a first diagnostic pulse of predetermined flux linkage into one of the phase windings;

injecting a second diagnostic pulse of predetermined flux linkage into another of the phase windings substantially simultaneously with injection of the first diagnostic pulse;

determining first possible rotor positions from a detected characteristic of the first pulse;

determining second possible rotor positions from a detected characteristic of the second pulse;

resolving rotor position ambiguity by a comparison of the first and second possible rotor positions; and storing in a look-up table pairs of possible values of rotor position for each of a range of values of the characteristic of the first and second pulses, wherein the look-up table stores a single value of rotor position for each of a range of values of the characteristics of the first and second pulses, the method including deriving the other of the possible values by calculation from symmetry of the magnetic characteristics of the machine.

37. A method of determining rotor position in a polyphase switched reluctance machine comprising a rotor, a stator and two or more phases of energizable windings, the method comprising:

injecting a first diagnostic pulse of predetermined flux linkage into one of the phase windings;

injecting a second diagnostic pulse of predetermined flux linkage into another of the phase windings substantially simultaneously with injection of the first diagnostic pulse;

determining first possible rotor positions from a detected characteristic of the first pulse;

determining second possible rotor positions from a detected characteristic of the second pulse;

resolving rotor position ambiguity by a comparison of the first and second possible rotor positions; and checking the rotor position by comparing a first determination with at least a second determination of rotor position;

wherein the machine is energized or de-energized depending on the check of the rotor position.

* * * * *

UNITED STATES PATENT AND TRADEMARK OFFICE
CERTIFICATE OF CORRECTION

PATENT NO.     : 6,291,949 B1
DATED          : September 18, 2001
INVENTOR(S)    : Charles Edward Brandon Green It is certified that error appears in the above-identified patent and that said Letters Patent is hereby corrected as shown below:

Column 6,
Line 39, "ory" has been changed to -- only --.

Column 7,
Line 52, "zero any" has been changed to -- zero as any --.

Column 12,
Line 33, "18" has been changed to -- 32 --.
Line 45, "allurement" has been changed to -- arrangement --.

Signed and Sealed this

Thirteenth Day of August, 2002

Attest:

JAMES E. ROGAN
Attesting Officer                Director of the United States Patent and Trademark Office